(12) United States Patent  
Chen et al.

(10) Patent No.: US 12,503,059 B2
(45) Date of Patent: Dec. 23, 2025

(54) ELECTRONIC DEVICE AND VEHICLE (71) Applicant: Innolux Corporation, Miaoli County (TW)

(72) Inventors: Hao-Yu Chen, Miaoli County (TW); Hong-Sheng Hsieh, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 358 days.

(21) Appl. No.: 17/964,061

(22) Filed: Oct. 12, 2022

(65) Prior Publication Data

US 2023/0150439 A1 May 18, 2023

Related U.S. Application Data

(60) Provisional application No. 63/279,178, filed on Nov. 15, 2021.

(30) Foreign Application Priority Data

Aug. 12, 2022 (CN) .......................... 202210968693.8

(51) Int. Cl.
| | | |
|---|---|---|
| *B60R 11/02* | (2006.01) | |
| *B60K 35/215* | (2024.01) | |
| *B60K 35/22* | (2024.01) | |
| *B60K 35/60* | (2024.01) | |
| *B60K 37/00* | (2024.01) | |
| *B60N 2/01* | (2006.01) | |
| *B60R 11/00* | (2006.01) | |
| *G02F 1/13* | (2006.01) | |
| *G02F 1/139* | (2006.01) | |

(52) U.S. Cl.
CPC ........ *B60R 11/0229* (2013.01); *B60K 35/215* (2024.01); *B60K 35/60* (2024.01); *B60K 37/00* (2013.01); *B60N 2/01* (2013.01); *G02F 1/1323* (2013.01); *G02F 1/1396* (2013.01); *B60K 35/223* (2024.01); *B60K 2360/349* (2024.01); *B60R 2011/0005* (2013.01)

(58) Field of Classification Search
CPC .................................................... G02F 1/1323
See application file for complete search history.

(56) References Cited

U.S. PATENT DOCUMENTS

2009/0058845 A1* 3/2009 Fukuda ................. G02F 1/1323
345/214
2016/0355091 A1* 12/2016 Lee ..................... B60R 11/0229
(Continued)

FOREIGN PATENT DOCUMENTS

| CN | 101872067 | 10/2010 |
|---|---|---|
| CN | 110785694 | 2/2020 |

(Continued)

*Primary Examiner* — Alexander P Gross
(74) *Attorney, Agent, or Firm* — JCIPRNET (57) ABSTRACT

An electronic device and a vehicle using the same are provided. The electronic device includes a display panel. The display panel is switched between a share mode and a privacy mode. In the privacy mode, a first light emission brightness measured at a first viewing angle is lower than a second light emission brightness measured at a normal line of the display panel, and a third light emission brightness measured at a second viewing angle is higher than the second light emission brightness.

19 Claims, 5 Drawing Sheets

(56) References Cited

U.S. PATENT DOCUMENTS

| | | | |
|---|---|---|---|
| 2020/0062118 A1* | 2/2020 | Wall | G06F 3/1423 |
| 2022/0269128 A1* | 8/2022 | Matsushima | G02F 1/1323 |
| 2023/0254457 A1* | 8/2023 | Robinson | G02F 1/133603 |
| | | | 349/1 |

FOREIGN PATENT DOCUMENTS

| | | | |
|---|---|---|---|
| CN | 112083597 | 12/2020 | |
| EP | 1352784 A2 * | 10/2003 | B60K 35/00 |

* cited by examiner

ELECTRONIC DEVICE AND VEHICLE

CROSS-REFERENCE TO RELATED APPLICATION

This application claims the priority benefit of U.S. provisional application Ser. No. 63/279,178, filed on Nov. 15, 2021, and China application serial no. 202210968693.8, filed on Aug. 12, 2022. The entirety of each of the above-mentioned patent applications is hereby incorporated by reference herein and made a part of this specification.

BACKGROUND

Technical Field

The disclosure relates to an electronic device and a vehicle.

Description of Related Art

In recent years, driving safety has received more and more attention. For safety reasons, the display panel on the passenger side needs a privacy functionality to avoid interfering with the driver. The current vehicle display panel is good in terms of the privacy aspect, but there is still room for improvement. For example, the front view brightness of the passenger in the privacy mode decreases, resulting in a poor viewing experience for the passenger.

SUMMARY

The disclosure provides an electronic device and a vehicle, which facilitate in improving the reduction of front view brightness of the passenger.

According to some embodiments of the disclosure, an electronic device includes a display panel. The display panel is switched between a share mode and a privacy mode. In the privacy mode, a first light emission brightness measured at a first viewing angle is lower than a second light emission brightness measured at a normal line of the display panel, and a third light emission brightness measured at a second viewing angle is higher than the second light emission brightness.

According to other embodiments of the disclosure, a vehicle includes a seat of a driver, a seat of a passenger, and a dashboard assembly. The seat of the passenger is disposed adjacent to the seat of the driver. The dashboard assembly is disposed opposite to the seat of the driver and the seat of the passenger, and includes a display panel. The display panel is switched between a share mode and a privacy mode. When viewed from a top view of the vehicle, the seat of the driver and the seat of the passenger are respectively located on both sides of a normal line of the display panel, and in the privacy mode, a first screen brightness viewed by the seat of the driver is lower than a front view screen brightness measured at the normal line, and a second screen brightness viewed by the seat of the passenger is higher than the front view screen brightness.

In order to make the above-mentioned features and advantages of the disclosure comprehensible, embodiments accompanied with drawings are described in detail below.

DETAILED DESCRIPTION OF DISCLOSED EMBODIMENTS

References of the exemplary embodiments of the disclosure are to be made in detail. Examples of the exemplary embodiments are illustrated in the drawings. If applicable, the same reference numerals in the drawings and the descriptions indicate the same or similar parts.

Certain terms may be used throughout the disclosure and the appended patent claims to refer to specific elements. It should be understood by those of ordinary skill in the art that electronic device manufacturers may refer to the same element by different names. The disclosure does not intend to distinguish between elements that have the same function but have different names. In the following description and patent claims, words such as "comprising" and "including" are open-ended words, so they should be interpreted as meaning "including but not limited to . . . ".

In the disclosure, wordings used to indicate directions, such as "up," "down," "front," "back," "left," and "right," merely refer to directions in the accompanying drawings. Therefore, the directional wordings are used to illustrate rather than limit the disclosure. In the accompanying drawings, the drawings illustrate the general features of the methods, structures, and/or materials used in the particular embodiments. However, the drawings shall not be interpreted as defining or limiting the scope or nature covered by the embodiments. For example, the relative sizes, thicknesses, and locations of the layers, regions, and/or structures may be reduced or enlarged for clarity.

A structure (or layer, element, substrate) described in this disclosure is located on/above another structure (or layer, element, substrate), may indicate that the two structures are adjacent and directly connected, or may indicate that the two structures are adjacent but not directly connected. Indirect connection means that there is at least one intermediate structure (or intermediate layer, intermediate element, intermediate substrate, intermediate spacer) between the two structures, the lower surface of one structure is adjacent to or directly connected to the upper surface of the intermediate structure, and the upper surface of another structure is adjacent to or directly connected to the lower surface of the intermediate structure. The intermediate structure may be composed of a single-layer or multi-layer physical structure or a non-physical structure, which is not limited thereto. In the disclosure, when a certain structure is disposed "on" other structures, it may mean that a certain structure is "directly" on other structures, or it means that a certain structure is "indirectly" on other structures, that is, at least one structure is sandwiched between a certain structure and other structures.

The terms "about", "equal to", "equal" or "same", "substantially" or "generally" are interpreted as within 20% of a given value, or interpreted as within 10%, 5%, 3%, 2%, 1%, or 0.5% of the given value or range. Furthermore, the terms "range from a first value to a second value", "range between a first value to a second value" mean that the range includes the first value, the second value, and other values in between.

The terms such as "first", "second", etc. used in the description and the patent claims are used to modify elements, which do not imply and represent that the (or these) elements have any previous ordinal numbers, and also does not represent the order of a certain element and another element, or the order of the manufacturing method. The use of these ordinal numbers is to only clearly distinguish an element with a certain name from another element with the same name. The same terms may not be used in the patent claims and the description, and accordingly, the first component in the description may be the second component in the patent claims.

The electrical connection or coupling described in the disclosure may refer to direct connection or indirect connection. In the case of a direct connection, the end points of two elements on a circuit directly connect to each other, or connect to each other through a conductive wire. In the case of indirect connection, a switch, a diode, a capacitor, an inductor, a resistor, other suitable elements, or a combination thereof, but not limited therein, is between the end points of two elements on a circuit.

In the disclosure, the thickness, length, and width may be measured by adopting a measurement method such as an optical microscope (OM), and the thickness or width may be measured from a cross-sectional image in an electronic microscope, but not limited thereto. In addition, any two values or directions used for comparison may have certain errors. For example, if a first direction is perpendicular to a second direction, an angle between the first direction and the second direction may be between 80 degrees and 100 degrees; if the first direction is parallel to the second direction, an angle between the first direction and the second direction may be between 0 degrees and 10 degrees.

It should be noted that, in the following embodiments, the features in several different embodiments may be replaced, reorganized, and mixed to complete other embodiments without departing from the spirit of the disclosure. As long as the features of the various embodiments do not violate the spirit of the disclosure or conflict with one another, they may be mixed and matched arbitrarily.

Unless otherwise defined, all terms (including technical and scientific terms) used herein have the same meaning as commonly understood by one of ordinary skill in the art to which this disclosure belongs. It is understood that these terms, such as those defined in commonly used dictionaries, should be interpreted as having meanings consistent with the relevant art and the background or context of the disclosure, and should not be interpreted in an idealized or overly formal manner, unless otherwise defined in the embodiments of the disclosure.

In the disclosure, an electronic device may include a display device, a backlight device, an antenna device, a sensing device or a splicing device, but is not limited thereto. The electronic device may be a bendable or flexible electronic device. The display device may be a non-self-luminous display device or a self-luminous display device. The electronic device may include, for example, liquid crystal, light emitting diode, fluorescence, phosphor, quantum dot (QD), other suitable display media, or a combination thereof. The antenna device may be a liquid crystal antenna device or a non-liquid crystal antenna device, and the sensing device may be a sensing device for sensing capacitance, light, heat or ultrasonic waves, but not limited thereto. In the disclosure, an electronic device may include electronic elements, and the electronic elements may include passive elements and active elements, such as a capacitor, a resistor, an inductor, a diode, a transistor, and the like. The diode may include a light emitting diode or a photodiode. The light emitting diode may include, for example, an organic light emitting diode (OLED), a mini light emitting diode (mini LED), a micro light emitting diode (micro LED), or a quantum dot light emitting diode (quantum dot LED), but not limited thereto. The splicing device may be, for example, a display splicing device or an antenna splicing device, but not limited thereto. It should be noted that, the electronic device may be any arrangement and combination of the foregoing, but not limited thereto. In addition, the shape of the electronic device may be rectangular, circular, polygonal, a shape with curved edges, or other suitable shapes. The electronic device may have a peripheral system such as a driving system, a control system, a light source system, and the like to support a display device, an antenna device, a wearable device (e.g., including augmented reality or virtual reality), an in-vehicle device (e.g., including car windshields), or a splicing device.

Figure 1A:
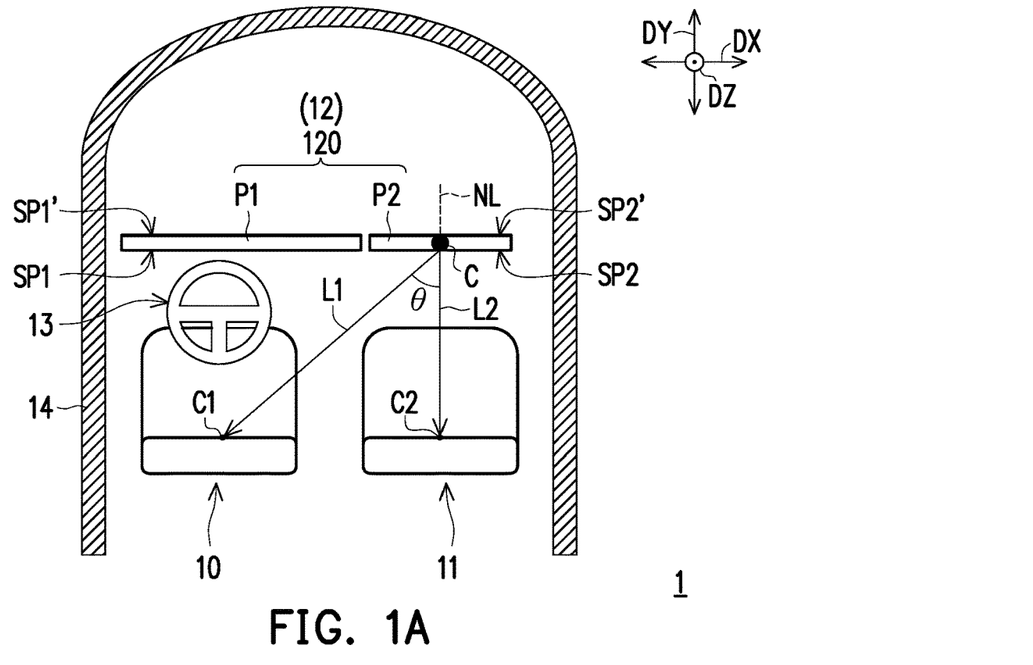
FIG. 1A and FIG. 1B are partial top schematic views of a vehicle in a share mode and a privacy mode, respectively, according to some embodiments of the disclosure.
Figure 1B:
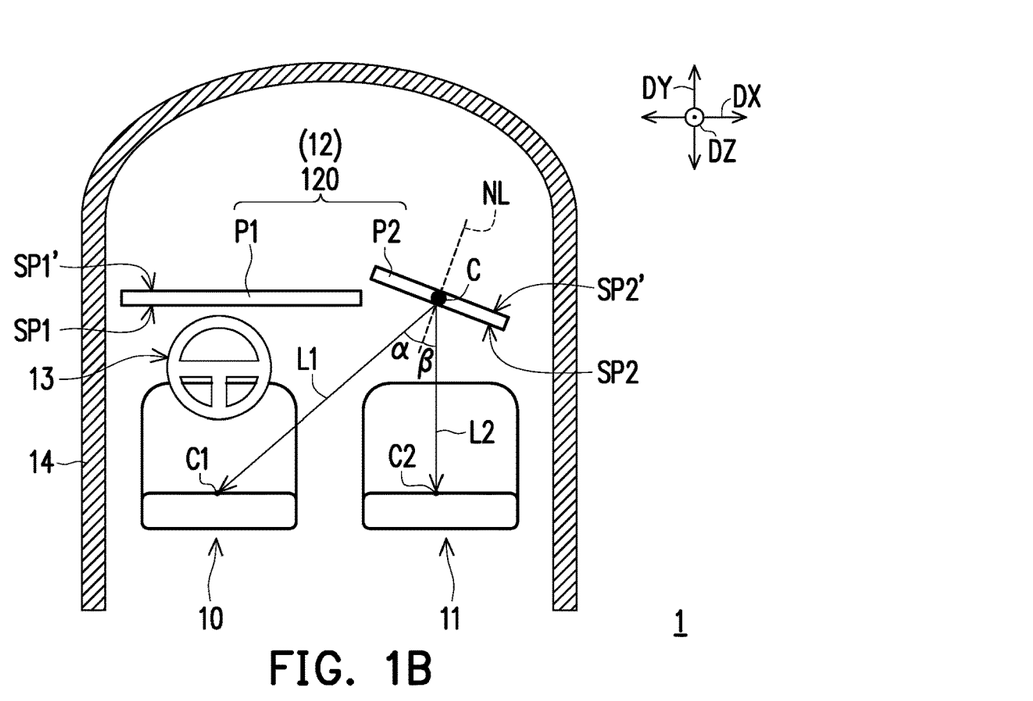
Figure 2A:
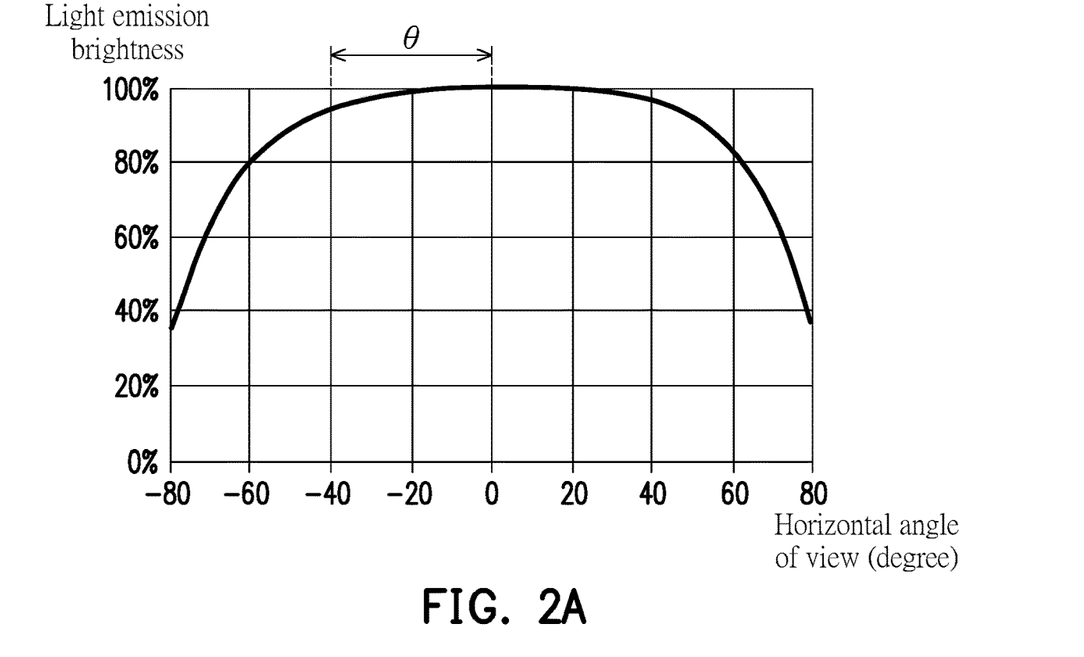
FIG. 2A and FIG. 2B are the horizontal angle of view light intensity distribution of the display panel in the share mode and the privacy mode, respectively.
Figure 2B:
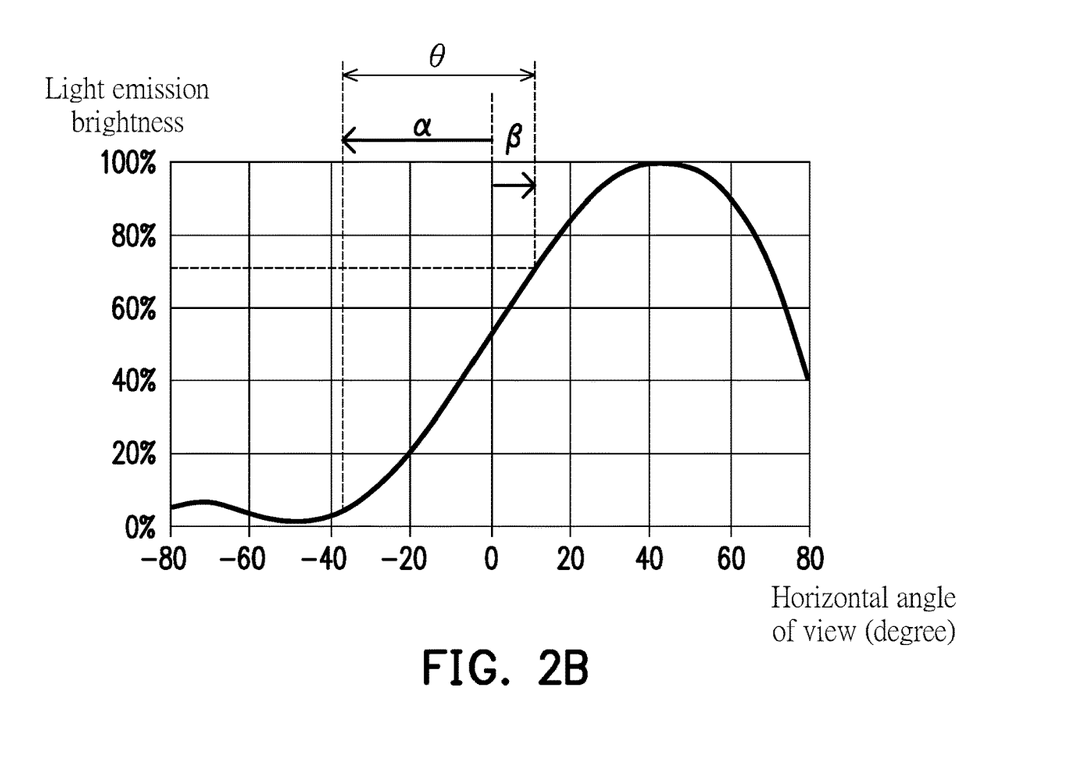
Figure 3:
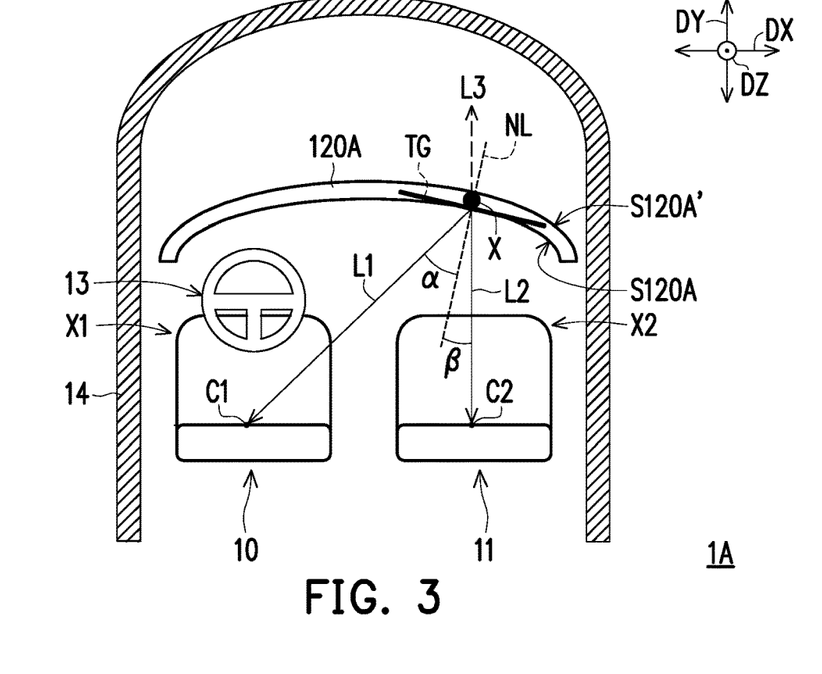
FIG. 3 and FIG. 4 are partial top schematic views of various vehicles, respectively, according to some embodiments of the disclosure.
Figure 4:
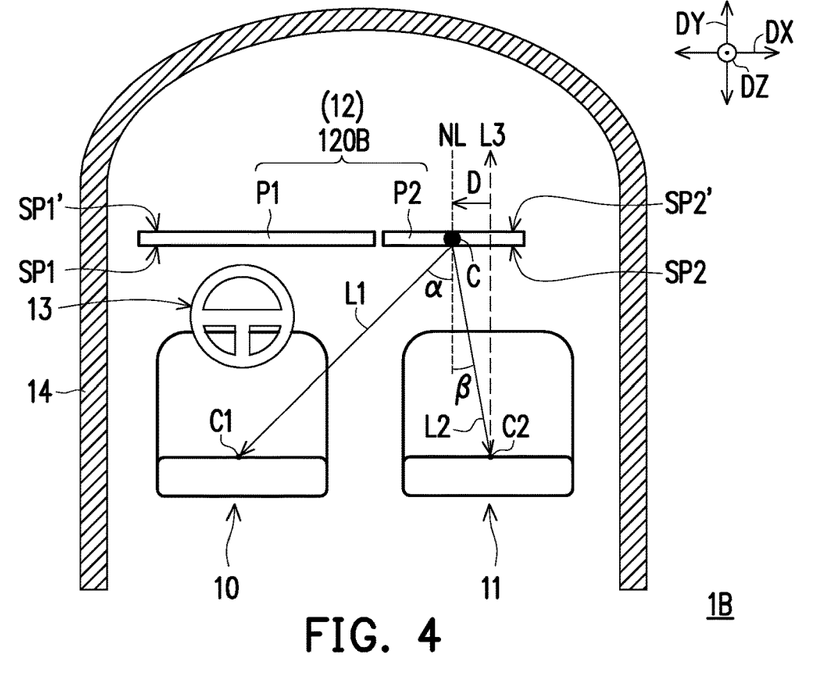

FIG. 1A and FIG. 1B are partial top schematic views of a vehicle in a share mode and a privacy mode, respectively, according to some embodiments of the disclosure. FIG. 2A and FIG. 2B are the horizontal angle of view light intensity distribution of the display panel of the electronic device in the share mode and the privacy mode, respectively. FIG. 3 and FIG. 4 are partial top schematic views of various vehicles, respectively, according to some embodiments of the disclosure. FIG. 5 to FIG. 8 are schematic views of the stacking relationship of internal elements of various electronic devices according to some embodiments of the disclosure. The technical solutions provided in the above-mentioned drawings may be replaced, combined, or mixed with one another, so as to constitute another embodiment without violating the spirit of the disclosure.

For convenience of description, in the embodiments of the disclosure, a dashboard assembly disposed in a vehicle is an example of the electronic device, but the disclosure is not limited thereto. For example, in some embodiments, the electronic device of the disclosure may be a dashboard or an audio-visual equipment in an aircraft cabin, or a display device used in a gaming machine in an electronic arcade. In the disclosure, the type of vehicle is not limited. For example, in terms of power, the vehicle may be an oil vehicle (e.g., a gasoline vehicle or a diesel vehicle), a hybrid electric vehicle, or an electric vehicle, but not limited thereto.

In the following disclosure, for the convenience of description, the connecting direction of the front pillars on both sides of the driver is the direction DX, the connecting direction of the front and rear of the vehicle is the direction DY, and the connecting direction of the roof and the bottom of the vehicle is the direction DZ. The direction DX, the direction DY, and the direction DZ are, for example, perpendicular to each other.

Referring to FIG. 1A and FIG. 1B, the vehicle 1 may include a seat of the driver 10, a seat of the passenger 11, and an electronic device (e.g., a dashboard assembly 12). The seat of the passenger 11 is disposed adjacent to the seat of the driver 10, and the dashboard assembly 12 is disposed opposite to the seat of the driver 10 and the seat of the passenger 11.

For the convenience of understanding and description, FIG. 1A and FIG. 1B also schematically illustrate a steering wheel 13 and a partial body 14, and other elements of the vehicle 1 are omitted, such as the front pillars, the front, the rear, the doors, the roof, the bottom, and the tires of the vehicle, etc.

As shown in FIG. 1A and FIG. 1B, the steering wheel 13 is disposed between the seat of the driver 10 and the dashboard assembly 12 in the direction DY, and the seat of the passenger 11 is adjacent to the seat of the driver 10 in the direction DX. According to different designs, the seat of the driver 10 may be located on the left side (i.e., left-hand drive) or the right side (i.e., right-hand drive) of the seat of the passenger 11.

An electronic device such as the dashboard assembly 12 may include, but is not limited to, a display panel 120. For example, although not shown, the electronic device (e.g., the dashboard assembly 12) may also include a touch panel to provide touch functionality. In addition, when the display panel 120 includes a non-self-luminous display panel (e.g., a liquid crystal display panel), the electronic device (e.g., the dashboard assembly 12) may further include a backlight unit (not shown). On the other hand, when the display panel 120 includes a self-luminous display panel (e.g., a light-emitting diode display panel), the electronic device (e.g., the dashboard assembly 12) may not include a backlight unit.

It should be understood that although the embodiment of the disclosure is described with the dashboard assembly 12 as the electronic device, the specific implementation of the electronic device may be changed according to actual application requirements, and is not limited to the dashboard assembly 12. For example, the electronic device of the disclosure may also be a touch device, a display device, or a combination thereof, but not limited thereto.

In an electronic device (e.g., the dashboard assembly 12), the display panel 120 may be a collection of multiple panels. For example, the display panel 120 may have a first portion P1 disposed opposite to the seat of the driver 10 and a second portion P2 disposed opposite to the seat of the passenger 11, and the second portion P2 is separated from the first portion P1, but not limited thereto. Although not shown, the display panel 120 may have more portions. Alternatively, the display panel 120 may be a single panel (as shown by the display panel 120A of FIG. 3), and the driver and the passenger share the panel.

In the display panel 120, the first portion P1 and the second portion P2 may be independently controlled, and the first portion P1 and the second portion P2 may display the same or different screens. For example, the first portion P1 disposed opposite to the seat of the driver 10 may display vehicle speed, remaining fuel, remaining battery, tire pressure, or other information for the driver, while the second portion P2 disposed opposite to the seat of the passenger 11 may display maps, video images, or other information for the passenger.

The first portion P1 has a surface SP1 facing the seat of the driver 10 and a surface SP1' facing away from the seat of the driver 10. The second portion P2 has a surface SP2 facing the seat of the passenger 11 and a surface SP2' facing away from the seat of the passenger 11. According to different requirements, the surface SP1, the surface SP1', the surface SP2, and the surface SP2' may be a plane (generally referring to a surface with an infinite radius of curvature), a curved surface, a surface with other topography, or a combination thereof. In addition, although FIG. 1A and FIG. 1B schematically illustrate that the first portion P1 is wider than the second portion P2 in the direction DX, the respective dimensions (e.g., length, width, or thickness, etc.) of the first portion P1 and the second portion P2 may be changed according to requirements, and are not limited thereto.

The display panel 120 may include a privacy unit (not shown). By switching the state of the privacy unit, the display panel 120 may be switched between a share mode and a privacy mode. When the display panel 120 includes multiple portions (e.g., the first portion P1 and the second portion P2), at least a portion of the display panel 120 may be switched between the share mode and the privacy mode. For example, both the first portion P1 and the second portion P2 may be switched between the share mode and the privacy mode. Alternatively, the second portion P2 may be switched between the share mode and the privacy mode, and the first portion P1 may have no mode switching functionality, but not limited thereto. In detail, the light emission of the display panel 120 in the privacy mode reaches a viewing angle range of a certain intensity (smaller than that in the share mode). For safety reasons, the second portion P2 disposed opposite to the seat of the passenger 11 may be switched to the privacy mode during the driving of the vehicle, so as to reduce the interference of the light emission of the second portion P2 to the driver.

The privacy unit of the display panel 120 may have a liquid crystal material, such as a twisted nematic (TN) liquid crystal material. FIG. 2A and FIG. 2B respectively show the horizontal angle of view light intensity distribution of the display panel adopting the twisted nematic liquid crystal privacy unit in the share mode and the privacy mode. In FIG. 2A and FIG. 2B, the horizontal angle of view refers to the angle between the normal line of the display panel and the viewing direction. When the display panel 120 includes the first portion P1 and the second portion P2, as shown in FIG. 1A and FIG. 1B, "the normal line of the display panel (such as the normal line NL)" refers to the normal vector perpendicular to the actuation area center point C (or referred to as the screen display area) of the second portion P2. When the second portion P2 adopts a curved surface configuration, "the normal line of the display panel (such as the normal line NL)" refers to the normal vector passing through and perpendicular to the actuation area center point C at the surface SP2 (or the surface SP2'). On the other hand, when the display panel is a single panel (as shown in the display panel 120A of FIG. 3), "the normal line of the display panel (such as the normal line NL)" refers to the normal vector passing through and perpendicular to the intersection point X. The intersection X is the intersection of the display panel 120A and the line segment L3 extending from the seat-back center C2 of the seat of the passenger 11 through the display panel 120A in the direction DY. When the display panel 120A adopts a curved surface configuration, "the normal line of the display panel (such as the normal line NL)" refers to the normal vector perpendicular to the tangent TG at the intersection X at the surface S120A (or the surface S120A'). The viewing direction is, for example, the connecting direction between the center of the light incident surface of the photodetector (not shown) used to measure the light emission brightness and the actuation area center point C (see FIG. 1A or FIG. 1B) or the intersection point X (see FIG. 3).

As shown in FIG. 2A, in the share mode, the light emission brightness of the display panel has a maximum value at a horizontal angle of view of 0 degrees, and the light emission brightness of the display panel gradually decreases as the horizontal angle of view increases. On the other hand, as shown in FIG. 2B, in the privacy mode, due to the asymmetric privacy characteristics of the twisted nematic liquid crystal privacy unit, the light emission brightness of the display panel has a maximum value at a horizontal angle of view of about 43 degrees, the light emission brightness of the display panel gradually decreases as the horizontal angle of view gradually moves away from 43 degrees, and the light emission brightness of the display panel approaches 0 when the horizontal angle of view is about minus 45 degrees. It should be noted that the brightness distribution curve shown in FIG. 2B is only an example, and the horizontal angle of view at which the maximum value and the minimum value of brightness appear may vary according to the difference of the liquid crystal material.

Referring to FIG. 1A, in the share mode, the first portion P1 and the second portion P2 are, for example, disposed side by side. The driver views the second portion P2 from the first viewing angle, and the passenger views the second portion P2 from the second viewing angle. The first viewing angle is the included angle between the normal line NL and a connecting line L1 connecting the seat-back center C1 of the seat of the driver 10 and the actuation area center point C. The second viewing angle is the included angle between the normal line NL and a connecting line L2 connecting the seat-back center C2 of the seat of the passenger 11 and the actuation area center point C. In the share mode, under the structure in which the seat-back center C2 of the seat of the passenger 11 and the actuation area center point C are aligned in the direction DY, the first viewing angle (e.g., angle θ) is, for example, about 45 degrees, and the second viewing angle is, for example, about 0 degrees. That is to say, the light emission brightness measured at the second viewing angle is equal to the light emission brightness measured at the normal line NL of the display panel.

When corresponding to FIG. 2A, since the first viewing angle is on the left side of the normal line NL, the light emission brightness at the first viewing angle should refer to the light emission brightness at the corresponding horizontal angle of view of about minus 45 degrees, which is about 80% to 90% of the maximum light emission brightness; the light emission brightness at the second viewing angle should refer to the light emission brightness at the corresponding horizontal angle of view of about 0 degrees, which is about 100% of the maximum light emission brightness. In other words, in the share mode, the light emission brightness measured at the first viewing angle (for example, called the fifth light emission brightness) and the light emission brightness measured at the second viewing angle (for example, called the sixth light emission brightness) is respectively 80% to 100% of the light emission brightness measured at the normal line NL of the display panel (for example, referred to as the fourth light emission brightness).

In the privacy mode, if the state that the first portion P1 and the second portion P2 in FIG. 1A is disposed side by side is maintained, the light emission brightness measured at the first viewing angle (refer to the light emission brightness at about minus 45 degrees corresponding to the horizontal angle of view in FIG. 2B) approaches 0, but the light emission brightness measured at the second viewing angle (refer to the light emission brightness at 0 degrees corresponding to the horizontal angle of view in FIG. 2B) is about 50% of the maximum light emission brightness, resulting in a poor viewing experience for the passenger (insufficient brightness).

In order to improve the screen brightness viewed by the passenger, as shown in FIG. 1B, in the privacy mode, the second portion P2 may be rotated relative to the first portion P1 by an angle β greater than 0 degrees and less than 90 degrees, so that the second viewing angle changes from 0 degrees to angle β, and the first viewing angle changes from angle θ to angle α. For the convenience of measurement, the angle α located on the left side of the normal line NL is set as a negative value, and the angle β located on the right side of the normal line NL is set as a positive value, and $|α|+|β|=|θ|$. Under this structure, the first viewing angle (e.g., the angle α) and the second viewing angle (e.g., the angle β) are respectively located on both sides of the normal line NL. In other words, the connecting line L1 from the actuation area center point C of the second portion P2 to the seat of the driver 10 (e.g., the seat-back center C1 of the seat of the driver 10) and the connecting line L2 from the actuation area center point C of the second portion P2 to the seat of the passenger 11 (e.g., the seat-back center C2 of the seat of the passenger 11) are respectively located on both sides of the normal line NL.

In this way, as shown in FIG. 2B, when an angle with an absolute value greater than 0 is included between the normal line NL of the second portion P2 and the connecting line L2, the interference of the light emission of the second portion P2 to the driver may be reduced, and the screen brightness viewed by the passenger may be improved. According to FIG. 2B, in the privacy mode, the first screen brightness viewed by the seat of the driver 10 (i.e., the first light emission brightness measured at the first viewing angle; refer to the light emission brightness corresponding to the angle α in FIG. 2B) is lower than the front view screen brightness measured at the normal line NL (i.e., the second light emission brightness measured at the normal line NL of the display panel; refer to the light emission brightness at the corresponding horizontal angle of view of 0 degrees in FIG. 2B), the second screen brightness viewed by the seat of the passenger 11 (i.e., the third light emission brightness measured at the second viewing angle; refer to the light emission brightness corresponding to the angle β in FIG. 2B) is higher than the front view screen brightness (i.e., the second light emission brightness). In some embodiments, the first screen brightness is 0% to 50% of the front view screen brightness, and the second screen brightness is 100% to 200% of the front view screen brightness. In addition, according to FIG. 2A and FIG. 2B, the light emission brightness measured at the normal line NL of the display panel in the share mode (for example, referred to as the fourth light emission brightness; refer to the light emission brightness at a corresponding horizontal angle of view of 0 degrees in FIG. 2A) is higher than the light emission brightness measured at the normal line NL of the display panel in the privacy mode (for example, referred to as the second light emission brightness; refer to the light emission brightness at a corresponding horizontal angle of view of 0 degrees in FIG. 2B).

In some embodiments, the absolute values of the angle α and the angle β are between 0 degrees and 60 degrees, i.e., 0 degrees≤|α|≤60 degrees, 0 degrees≤|β|≤60 degrees, and $|α|+|β|$ is between 20 degrees and 60 degrees, i.e., 20 degrees≤|α|+|β|≤60 degrees, but not limited thereto.

It should be noted that this embodiment is described in the left-hand drive mode. When the vehicle is of a right-hand drive, the second portion P2 needs to disposed in a way such that the brightness distribution of the light emission of the second portion P2 in the privacy mode is exactly opposite to that in FIG. 2B. For example, the light emission brightness of the display panel at this time has a maximum value at a horizontal angle of view of about minus 43 degrees, and approaches 0 at a horizontal angle of view of about 45 degrees. In a right-hand drive vehicle, the first viewing angle corresponding to the seat of the driver becomes the right side of the normal line NL, and the second viewing angle corresponding to the seat of the passenger becomes the left side of the normal line NL. Therefore, the angle α of the first viewing angle is set to a positive value, and the angle β of the second viewing angle is set to a negative value.

Referring to FIG. 3, the main difference between the vehicle 1A and the vehicle 1 in FIG. 1A and FIG. 1B is that the seat of the driver 10 and the seat of the passenger 11 share the display panel 120A, and the display panel 120A includes curved surfaces, such as the surface S120A and the surface S120A' of the display panel 120A are both curved surfaces. The curved surfaces extend from a side X1 of the seat of the driver 10 away from the seat of the passenger 11 to a side X2 of the seat of the passenger 11 away from the seat of the driver 10. In some embodiments, the radius of curvature of the surface S120A and the surface S120A' may be 500 mm to 20000 mm (500 mm radius of curvature 20000 mm), but not limited thereto.

Under the structure of FIG. 3, whether in the share mode or in the privacy mode, the first viewing angle (e.g., the angle α) and the second viewing angle (e.g., the angle β) are respectively located on both sides of the normal line NL. In other words, the connecting line L1 from the intersection point X to the seat of the driver 10 (e.g., the seat-back center C1 of the seat of the driver 10) and the connecting line L2 from the intersection point X to the seat of the passenger 11 (e.g., the seat-back center C2 of the seat of the passenger 11) are respectively located on both sides of the normal line NL.

As mentioned above, through the design that the first viewing angle (e.g., the angle α) and the second viewing angle (e.g., the angle β) are located on both sides of the normal line NL, it is possible to reduce the interference of the light emission from the display panel 120A to the driver in the privacy mode, and improve the screen brightness viewed by the passenger.

In some embodiments, in the share mode, the light emission brightness measured at the first viewing angle (for example, called the fifth light emission brightness) and the light emission brightness measured at the second viewing angle (for example, called the sixth light emission brightness) may respectively be 80% to 100% of the light emission brightness measured at the normal line NL of the display panel (for example, referred to as the fourth light emission brightness).

In some embodiments, in the privacy mode, the first screen brightness viewed by the seat of the driver 10 (i.e., the first light emission brightness measured at the first viewing angle; refer to the light emission brightness corresponding to the angle α in FIG. 2B) is lower than the front view screen brightness measured at the normal line NL (i.e., the second light emission brightness measured at the normal line NL of the display panel; refer to the light emission brightness at the corresponding horizontal angle of view of 0 degrees in FIG. 2B), the second screen brightness viewed by the seat of the passenger 11 (i.e., the third light emission brightness measured at the second viewing angle; refer to the light emission brightness corresponding to the angle β in FIG. 2B) is higher than the front view screen brightness (i.e., the second light emission brightness).

In some embodiments, the first screen brightness is 0% to 50% of the front view screen brightness, and the second screen brightness is 100% to 200% of the front view screen brightness. In addition, according to FIG. 2A and FIG. 2B, the light emission brightness measured at the normal line NL of the display panel in the share mode (for example, referred to as the fourth light emission brightness; refer to the light emission brightness at a corresponding horizontal angle of view of 0 degrees in FIG. 2A) is higher than the light emission brightness measured at the normal line NL of the display panel in the privacy mode (for example, referred to as the second light emission brightness; refer to the light emission brightness at a corresponding horizontal angle of view of 0 degrees in FIG. 2B).

In some embodiments, the absolute values of the angle α and the angle β are between 0 degrees and 60 degrees, i.e., 0 degrees≤|α|≤60 degrees, 0 degrees≤|β|≤60 degrees, and |α|+|β| is between 20 degrees and 60 degrees, i.e., 20 degrees≤|α|+|β|≤60 degrees, but not limited thereto.

Referring to FIG. 4, the main difference between the vehicle 1B and the vehicle 1 of FIG. 1A and FIG. 1B is that in the display panel 120B of FIG. 4, the actuation area center point C is shifted to the left by a distance D from the seat-back center C2 of the seat of the passenger 11 in the direction DY, so that, whether in the share mode or in the privacy mode, the first viewing angle (e.g., the angle α) and the second viewing angle (e.g., the angle β) are respectively located on both sides of the normal line NL. In other words, the connecting line L1 from the actuation area center point C of the second portion P2 to the seat of the driver 10 (e.g., the seat-back center C1 of the seat of the driver 10) and the connecting line L2 from the actuation area center point C of the second portion P2 to the seat of the passenger 11 (e.g., the seat-back center C2 of the seat of the passenger 11) are respectively located on both sides of the normal line NL. Through the design that the actuation area center point C is shifted to the left by the distance D from the seat-back center C2 of the seat of the passenger 11 in the direction DY, the interference of the light emission of the second portion P2 to the driver may be reduced in the privacy mode, and the screen brightness viewed by the passenger may be improved, therefore, the second portion P2 may not need to be rotated further.

FIG. 5 to FIG. 8 respectively illustrate schematic views of the stacking relationship of internal elements of four types of electronic devices. The electronic device of any of the above-mentioned embodiments may adopt any one of the four types of electronic devices, the above-mentioned improvement (described later), or other electronic devices (not shown) with a privacy effect.

Figure 5:
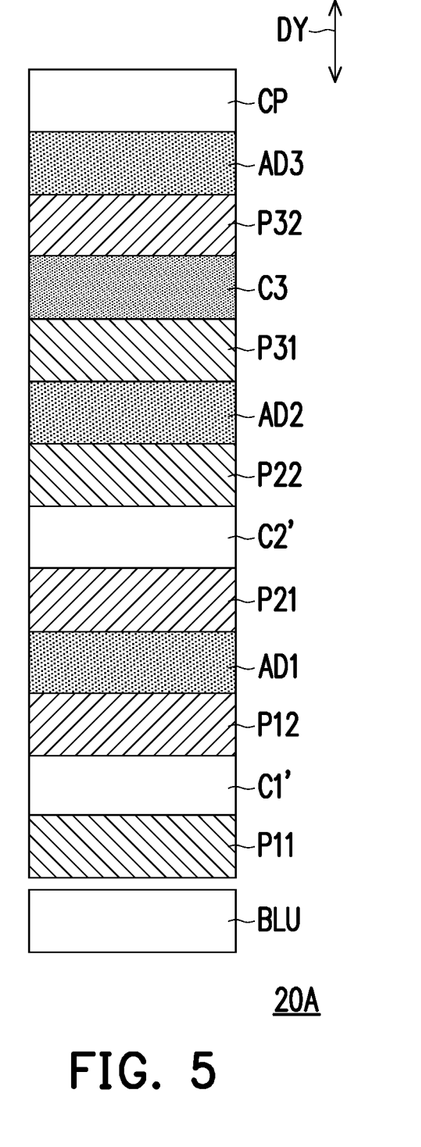
FIG. 5 to FIG. 8 are schematic views of the stacking relationship of internal elements of various electronic devices according to some embodiments of the disclosure.

Referring to FIG. 5, the electronic device 20A is, for example, a non-self-luminous display panel and includes a backlight unit BLU, a polarizer P11, a privacy unit C1', a polarizer P12, an adhesive layer AD1, a polarizer P21, a privacy unit C2', a polarizer P22, an adhesive layer AD2, a polarizer P31, a display unit C3, a polarizer P32, an adhesive layer AD3, and a cover plate CP, but not limited thereto. The electronic device 20A may add or subtract one or more elements or film layers according to different requirements.

The polarizer P11, the privacy unit C1', the polarizer P12, the adhesive layer AD1, the polarizer P21, the privacy unit C2', the polarizer P22, the adhesive layer AD2, the polarizer P31, the display unit C3, the polarizer P32, the adhesive layer AD3, and the cover plate CP are sequentially stacked on the backlight unit BLU in the direction DY, and the cover plate CP is, for example, disposed adjacent to the user. Taking the second portion P2 of FIG. 1A as an example, the cover plate CP is, for example, disposed adjacent to the passenger and located between the backlight unit BLU and the passenger.

The polarizer P11 and the polarizer P12 respectively disposed on opposite sides of the privacy unit C1' may have transmission axes perpendicular to each other. Although not shown, the privacy unit C1' may have two substrates disposed opposite to each other, two conductive layers disposed between the two substrates, and a dielectric layer disposed between the two conductive layers. For example, the dielectric layer may be a liquid crystal layer. The liquid crystals may include twisted nematic liquid crystals or other types of liquid crystals. The thickness of the dielectric layer may be 450 nanometers (nm) to 1200 nanometers (450 nanometers≤the thickness of the dielectric layer≤1200 nanometers), but not limited thereto. The voltage difference between the two conductive layers may be 2 volts to 2.7 volts (2 volts≤voltage difference≤2.7 volts), but not limited thereto.

Similarly, the polarizer P21 and the polarizer P22 respectively disposed on opposite sides of the privacy unit C2' may have transmission axes perpendicular to each other. Although not shown, the privacy unit C2' may have two substrates disposed opposite to each other, two conductive layers disposed between the two substrates, and a dielectric layer disposed between the two conductive layers. For example, the dielectric layer may be a liquid crystal layer. The liquid crystals may include twisted nematic liquid crystals or other types of liquid crystals. The thickness of the dielectric layer may be 450 nm to 1200 nm (450 nm≤the thickness of the dielectric layer≤1200 nm), but not limited thereto. The voltage difference between the two conductive layers may be 2 volts to 2.7 volts (2 volts≤voltage difference≤2.7 volts), but not limited thereto.

The polarizer P31 and the polarizer P32 respectively disposed on opposite sides of the display unit C3 may have transmission axes perpendicular to each other. Although not shown, the display unit C3 may have upper and lower substrates disposed opposite to each other, an element array layer (e.g., an active element array layer) disposed on the lower substrate, one or more conductive layers disposed on the element array layer, a dielectric layer disposed on the one or more conductive layers, a filter layer disposed between the dielectric layer and the upper substrate, etc., but not limited thereto. The dielectric layer may be a liquid crystal layer, a light-emitting layer, or other display dielectric.

The polarizer P21 may be attached to the polarizer P12 through the adhesive layer AD1, and the polarizer P21 and the polarizer P12 respectively disposed on opposite sides of the adhesive layer AD1 may have transmission axes parallel to each other. Similarly, the polarizer P31 may be attached to the polarizer P22 through the adhesive layer AD2, and the polarizer P31 and the polarizer P22 respectively disposed on opposite sides of the adhesive layer AD2 may have transmission axes parallel to each other. The cover plate CP may be attached to the polarizer P32 through the adhesive layer AD3. The materials of the adhesive layer AD1, the adhesive layer AD2, and the adhesive layer AD3 may include optical clear adhesive (OCA) or optical clear resin (OCR), but not limited thereto. The cover plate CP may be a rigid substrate or a flexible substrate. The material of the cover plate CP includes, for example, glass, quartz, ceramics, sapphire, or plastic, etc., but not limited thereto.

In some embodiments, the adhesive layer AD1 and the adhesive layer AD2 may be omitted, and an air gap may exist between the polarizer P21 and the polarizer P12 and between the polarizer P31 and the polarizer P22. In some embodiments, the polarizer P12 and the polarizer P22 may be omitted. In some embodiments, when the backlight unit BLU may provide light with a polarization direction, the polarizer P11, the polarizer P12, and the polarizer P22 may be omitted. In some embodiments, one of the privacy units (e.g., the privacy unit C1' or the privacy unit C2'), the polarizers on opposite sides of the privacy unit, and the corresponding adhesive layers may be omitted. For example, the polarizer P11, the privacy unit C1', the polarizer P12, and the adhesive layer AD1 may be omitted, but not limited thereto.

Figure 6:
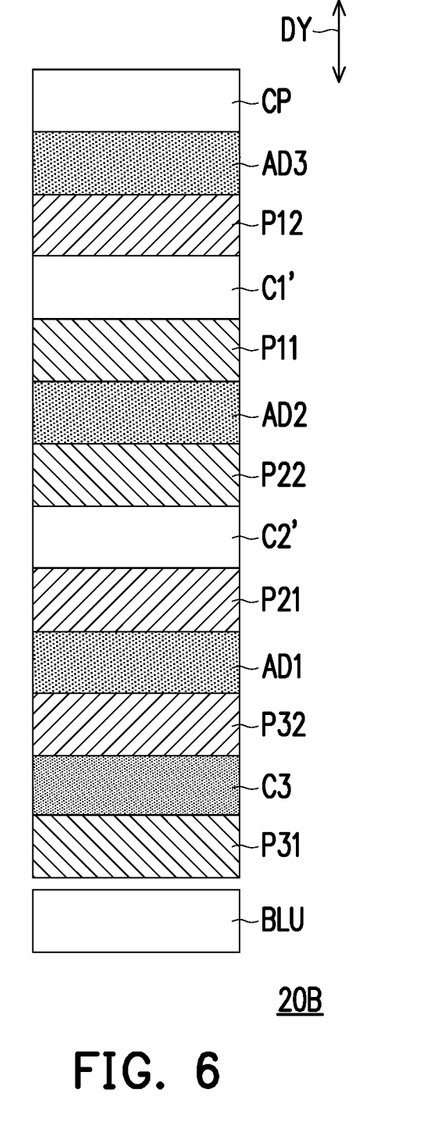

Referring to FIG. 6, the main differences between the electronic device 20B and the electronic device 20A of FIG. 5 are described as follows. In the electronic device 20B, the positions of the polarizer P11, the privacy unit C1', and the polarizer P12 are, for example, reversed with the positions of the polarizer P31, the display unit C3, and the polarizer P32. The polarizer P21 may be attached to the polarizer P32 through the adhesive layer AD1, and the polarizer P21 and the polarizer P32 respectively disposed on opposite sides of the adhesive layer AD1 may have transmission axes parallel to each other. Similarly, the polarizer P11 may be attached to the polarizer P22 through the adhesive layer AD2, and the polarizer P11 and the polarizer P22 respectively disposed on opposite sides of the adhesive layer AD2 may have transmission axes parallel to each other. The cover plate CP may be attached to the polarizer P12 through the adhesive layer AD3.

In some embodiments, the adhesive layer AD1 and the adhesive layer AD2 may be omitted, and an air gap may exist between the polarizer P32 and the polarizer P21 and between the polarizer P22 and the polarizer P11. In some embodiments, the polarizer P32 and the polarizer P22 may be omitted. In some embodiments, when the backlight unit BLU may provide light with a polarization direction, the polarizer P31, the polarizer P32, and the polarizer P22 may be omitted. In some embodiments, one of the privacy units (e.g., the privacy unit C1' or the privacy unit C2'), the polarizers on opposite sides of the privacy unit, and the corresponding adhesive layers may be omitted. For example, the polarizer P21, the privacy unit C2', the polarizer P22, and the adhesive layer AD1 may be omitted, but not limited thereto.

Figure 7:
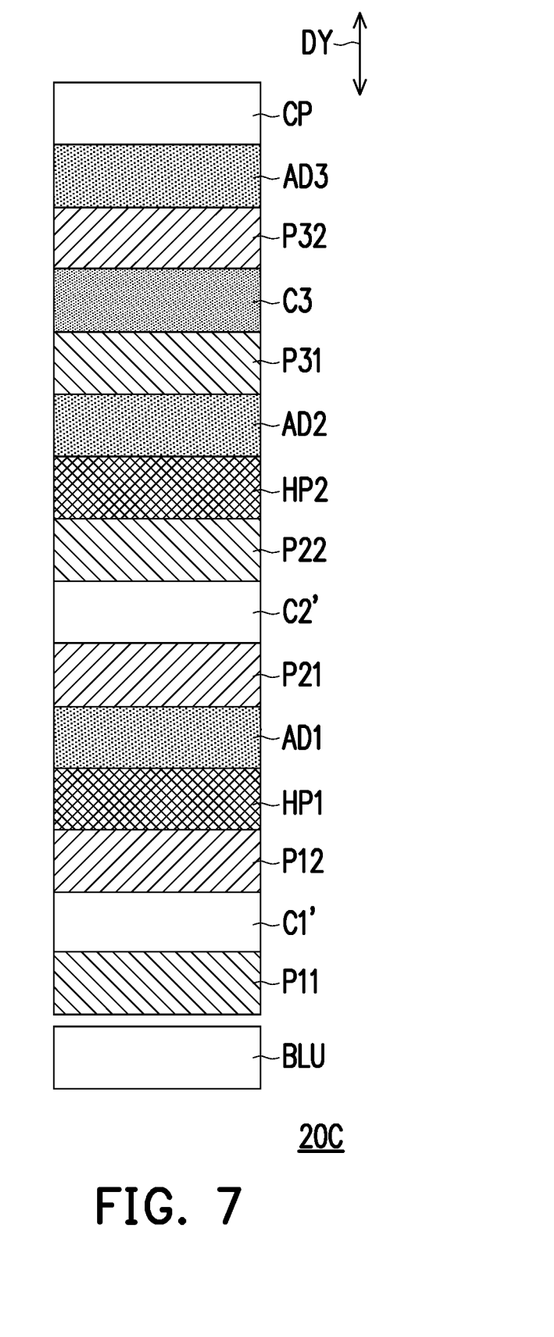

Referring to FIG. 7, the main differences between the electronic device 20C and the electronic device 20A of FIG. 5 are described as follows. The electronic device 20C further includes a half-wave plate HP1 and a half-wave plate HP2, in which the half-wave plate HP1 is disposed between the polarizer P12 and the adhesive layer AD1, and the half-wave plate HP2 is disposed between the polarizer P22 and the adhesive layer AD2. By disposing the half-wave plate HP1, the polarizer P12 and the polarizer P21 may not have transmission axes parallel to each other. Similarly, by disposing the half-wave plate HP2, the polarizer P22 and the polarizer P31 may not have transmission axes parallel to each other. In detail, if the included angle between the optical axis of the half-wave plate HP1 and the transmission axis of the polarizer P12 is ψ, then the included angle between the transmission axis of the polarizer P21 and the transmission axis of the polarizer P12 is 2ψ. Similarly, if the included angle between the optical axis of the half-wave plate HP2 and the transmission axis of the polarizer P22 is ψ', then the included angle between the transmission axis of the polarizer P31 and the transmission axis of the polarizer P22 is 2ψ'.

In some embodiments, the adhesive layer AD1 and the adhesive layer AD2 may be omitted, and an air gap may exist between the polarizer P21 and the half-wave plate HP1 and between the polarizer P31 and the half-wave plate HP2. In some embodiments, the half-wave plate HP1 and the polarizer P21 may be omitted. In some embodiments, when the backlight unit BLU may provide light with a polarization direction, the polarizer P11, the half-wave plate HP1, and the polarizer P21 may be omitted. In some embodiments, one of the privacy units (e.g., the privacy unit C1' or the privacy unit C2'), the polarizers on opposite sides of the privacy unit, and the corresponding adhesive layer and half-wave plate may be omitted. For example, the polarizer P11, the privacy unit C1', the polarizer P12, the half-wave plate HP1, and the adhesive layer AD1 may be omitted, but not limited thereto.

Figure 8:
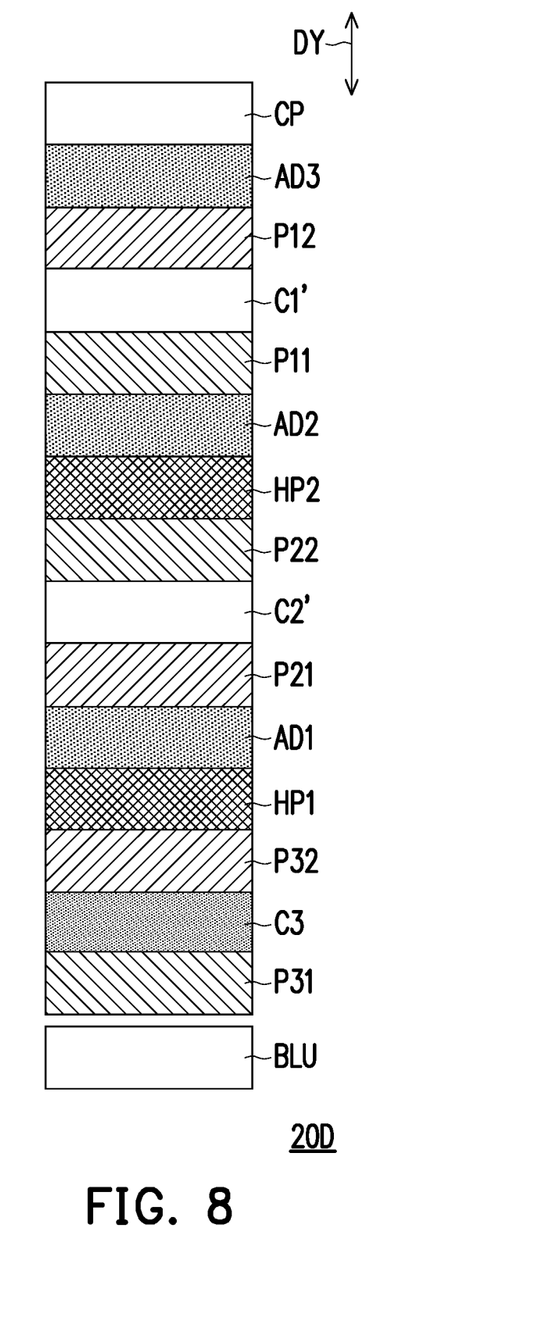

Referring to FIG. 8, the main differences between the electronic device 20D and the electronic device 20C of FIG. 7 are described as follows. In the electronic device 20D, the positions of the polarizer P11, the privacy unit C1', and the polarizer P12 are, for example, reversed with the positions of the polarizer P31, the display unit C3, and the polarizer P32, in which the half-wave plate HP1 is disposed between the polarizer P32 and the adhesive layer AD1, and the half-wave plate HP2 is disposed between the polarizer P22 and the adhesive layer AD2. By disposing the half-wave plate HP1, the polarizer P32 and the polarizer P21 may not have transmission axes parallel to each other. Similarly, by disposing the half-wave plate HP2, the polarizer P22 and the polarizer P11 may not have transmission axes parallel to each other. In detail, if the included angle between the optical axis of the half-wave plate HP1 and the transmission axis of the polarizer P32 is $\psi$, then the included angle between the transmission axis of the polarizer P21 and the transmission axis of the polarizer P32 is $2\psi$. Similarly, if the included angle between the optical axis of the half-wave plate HP2 and the transmission axis of the polarizer P22 is $\psi'$, then the included angle between the transmission axis of the polarizer P11 and the transmission axis of the polarizer P22 is $2\psi'$.

In some embodiments, the adhesive layers AD1 and the adhesive layer AD2 may be omitted, and an air gap may exist between the half-wave plate HP1 and the polarizer P21 and between the half-wave plate HP2 and the polarizer P11. In some embodiments, the half-wave plate HP2 and the polarizer P11 may be omitted. In some embodiments, when the backlight unit BLU may provide light with a polarization direction, the polarizer P31, the half-wave plate HP2, and the polarizer P11 may be omitted. In some embodiments, one of the privacy units (e.g., the privacy unit C1' or privacy unit C2'), the polarizers on opposite sides of the privacy unit, and the corresponding adhesive layer may be omitted. For example, the polarizer P11, the privacy unit C1', the polarizer P12, the half-wave plate HP2, and the adhesive layer AD2 may be omitted, but not limited thereto.

To sum up, in the embodiments of the disclosure, the relative relationship between different viewing angles and the normal line may be controlled to reduce the interference of the light emission from the display panel to the driver, and improve the screen brightness viewed by the passenger.

The foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

Although the embodiments of the disclosure and the advantages thereof have been disclosed above, it should be understood that any person with ordinary skill in the art may make changes, substitutions, and modifications without departing from the spirit and scope of the disclosure, and the features of the various embodiments may be arbitrarily mixed and replaced with one another to form other new embodiments. In addition, the protection scope of the disclosure is not limited to the processes, machines, manufactures, compositions of the matter, devices, methods, and steps in the specific embodiments described in the specification. It is understood that processes, machines, manufactures, compositions of matter, devices, methods, and steps developed in the present or in the future may be used in accordance with the disclosure as long as they may implement substantially the same functions or achieve substantially the same results in the embodiments described herein. Therefore, the protection scope of the disclosure includes the above-mentioned processes, machines, manufactures, compositions of matter, devices, methods, and steps. In addition, each of the claims constitutes a separate embodiment, and the protection scope of the disclosure also includes each of the combinations of the claims and the embodiments. The protection scope of the disclosure shall be determined by the appended patent claims.

What is claimed is:

1. An electronic device, comprising:
   display panel, switched between a share mode and a privacy mode;
   wherein, in the privacy mode, a first light emission brightness measured at a first viewing angle is lower than a second light emission brightness measured at a normal line of the display panel, and a third light emission brightness measured at a second viewing angle is higher than the second light emission brightness,
   wherein the display panel comprises an actuation area center point, the normal line passes through the actuation area center point, and a connecting line from the actuation area center point to a seat of a driver and a connecting line from the actuation area center point to a seat of a passenger are respectively located on both sides of the normal line.

2. The electronic device according to claim 1, wherein the first viewing angle and the second viewing angle are respectively located on both sides of the normal line.

3. The electronic device according to claim 1, wherein a fourth light emission brightness measured at the normal line of the display panel in the share mode is higher than the second light emission brightness measured at the normal line of the display panel in the privacy mode.

4. The electronic device according to claim 3, wherein a fifth light emission brightness measured at the first viewing angle and a sixth light emission brightness measured at the second viewing angle in the share mode are respectively 80% to 100% of the fourth light emission brightness.

5. The electronic device according to claim 1, wherein the display panel comprises a privacy unit.

6. The electronic device according to claim 5, wherein the privacy unit comprises a twisted nematic liquid crystal material.

7. The electronic device according to claim 1, wherein the first light emission brightness is 0% to 50% of the second light emission brightness, and the third light emission brightness is 100% to 200% of the second light emission brightness.

8. A vehicle, comprising:
   a seat of a driver;
   a seat of a passenger, disposed adjacent to the seat of the driver; and
   a dashboard assembly, disposed opposite to the seat of the driver and the seat of the passenger and comprising:
   a display panel, switched between a share mode and a privacy mode, wherein when viewed from a top view of the vehicle, the seat of the driver and the seat of the passenger are respectively located on both sides of a normal line of the display panel, and in the privacy mode, a first screen brightness viewed by the seat of the driver is lower than a front view screen brightness measured at the normal line, and a second screen brightness viewed by the seat of the passenger is higher than the front view screen brightness, wherein the display panel comprises an actuation area center point, the normal line passes through the actuation area center point, and a connecting line from the actuation area center point to the seat of the driver and a connecting line from the actuation area center point to the seat of the passenger are respectively located on both sides of the normal line.

9. The vehicle according to claim 8, wherein the first screen brightness is 0% to 50% of the front view screen brightness, and the second screen brightness is 100% to 200% of the front view screen brightness.

10. The vehicle according to claim 8, wherein the display panel has a first portion disposed opposite to the seat of the driver and a second portion disposed opposite to the seat of the passenger, the second portion is separated from the first portion, and the second portion comprises the actuation area center point.

11. The vehicle according to claim 10, wherein in the privacy mode, the second portion is rotated relative to the first portion by an angle greater than 0 degrees and less than 90 degrees.

12. The vehicle according to claim 11, wherein the angle is greater than 0 degrees and less than or equal to 60 degrees.

13. The vehicle according to claim 11, wherein in the share mode, the second portion and the first portion are disposed side by side.

14. The vehicle according to claim 10, wherein the second portion and the first portion are arranged on a first direction, the actuation area center point is shifted towards the first portion by a distance in the first direction from a projection of a seat-back center of the seat of the passenger on the dashboard assembly in a second direction perpendicular to the first direction.

15. The vehicle according to claim 14, wherein in the share mode and in the privacy mode, the second portion and the first portion are disposed side by side.

16. The vehicle according to claim 8, wherein the display panel comprises a curved surface, the curved surface extends from a side of the seat of the driver facing away from the seat of the passenger to a side of the seat of the passenger facing away from the seat of the driver.

17. The vehicle according to claim 8, wherein the display panel comprises a privacy unit.

18. The vehicle according to claim 17, wherein the privacy unit comprises a twisted nematic liquid crystal material.

19. The vehicle according to claim 17, wherein the display panel has a first portion disposed opposite to the seat of the driver and a second portion disposed opposite to the seat of the passenger, the second portion is separated from the first portion, and the second portion comprises the privacy unit.

* * * * *